United States Patent
Oguri et al.

(10) Patent No.: US 7,805,995 B2
(45) Date of Patent: Oct. 5, 2010

(54) VIBRATING GYROSCOPE

(75) Inventors: Shinya Oguri, Takaoka (JP); Masato Koike, Nakaniikawa-gun (JP); Haruyoshi Kurakawa, Toyama (JP); Katsumi Fujimoto, Toyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/235,721

(22) Filed: Sep. 23, 2008

(65) Prior Publication Data

US 2009/0007666 A1    Jan. 8, 2009

Related U.S. Application Data

(63) Continuation of application No. PCT/JP2006/316340, filed on Aug. 21, 2006.

(30) Foreign Application Priority Data

Apr. 26, 2006    (JP) .............................. 2006-122326

(51) Int. Cl.
    *G01P 9/04*    (2006.01)
(52) U.S. Cl. .................................. 73/504.16
(58) Field of Classification Search ............. 73/504.16; 310/348, 370
    See application file for complete search history.

(56) References Cited

U.S. PATENT DOCUMENTS 4,069,434 A * 1/1978 Kawai et al. ................. 310/348

FOREIGN PATENT DOCUMENTS

| JP | 52-119884 A | 10/1977 |
|---|---|---|
| JP | 54-058395 A | 5/1979 |
| JP | 11-023285 A | 1/1999 |
| JP | 2000-292171 A | 10/2000 |
| JP | 2001-210673 A | 8/2001 |
| JP | 2004-289478 A | 10/2004 |
| JP | 2005-260727 A | 9/2005 |

OTHER PUBLICATIONS

Official Communication issued in International Patent Application No. PCT/JP2006/316340, mailed on Nov. 7, 2006.

* cited by examiner

*Primary Examiner*—John E Chapman
(74) *Attorney, Agent, or Firm*—Keating & Bennett, LLP

(57) ABSTRACT

A vibrating gyroscope includes a tuning-fork vibrator having a base and legs. The vibrator is joined to a support plate by conductive adhesive members. The support plate includes an outer frame portion in which a joining portion is provided at a location near a longitudinal end of the outer frame portion. The joining portion is supported by a first support portion in the air gap portion. The width of the first support portion is less than the width of the joining portion. The vibrator is joined to the joining portion of the support plate.

11 Claims, 10 Drawing Sheets

VIBRATING GYROSCOPE

BACKGROUND OF THE INVENTION

1. Field of the Invention

The present invention relates to vibrating gyroscopes, and more particularly, to a vibrating gyroscope used to an image stabilizer in, for example, a digital still camera and a digital video camera.

2. Description of the Related Art

FIG. 18 is a perspective view illustrating an example of a known vibrating gyroscope. The vibrating gyroscope 1 includes a tuning-fork vibrator 2. The vibrator 2 includes a base 2a and two legs 2b and 2b that extend from the base 2a. The vibrator 2 includes two tuning-fork-shaped piezoelectric substrates 3a and 3b that are laminated on each other. The laminated piezoelectric substrates 3a and 3b are polarized in opposite directions along the thickness thereof. An intermediate metal layer 4 is interposed between the piezoelectric substrates 3a and 3b. In addition, drive electrodes 5a, 5b, and 5c are provided on a principal surface of the piezoelectric substrate 3a. The three drive electrodes 5a, 5b, and 5c are separated from each other in a width direction of the piezoelectric substrate 3a. More specifically, the drive electrodes 5a, 5b, and 5c are separated from each other by separating portions that extend in the longitudinal direction of the legs 2b and 2b. In addition, detection electrodes 6a and 6b are provided on a principal surface of the other piezoelectric substrate 3b. The two detection electrodes 6a and 6b are separated from each other at a central portion of the piezoelectric substrate 3b in the width direction thereof.

The vibrator 2 is attached to a support plate 7. The support plate 7 has, for example, a substantially rectangular plate shape, and the base 2a of the vibrator 2 is adhered to a central portion of the support plate 7. The support plate 7 includes supporting rods 8 at locations spaced from a portion at which the base 2a is adhered toward the ends of the support plate 7. The supporting rods 8 are arranged so as to extend from end portions of the support plate 7 along the legs 2b and 2b of the vibrator 2. The vibrator 2 is fixed to a case or other suitable structure by the supporting rods 8.

In the vibrating gyroscope 1, an oscillator circuit is connected between the middle drive electrode 5b and the drive electrodes 5a and 5c disposed on either side of the middle drive electrode 5b. The oscillator circuit includes, for example, an amplifier circuit and a phase compensator circuit. The detection electrodes 6a and 6b are connected to a detection circuit. The detection circuit includes a differential circuit, a synchronous detection circuit, an integrator circuit, a direct-current amplifier circuit, etc.

The oscillator circuit applies an electric field to the vibrator 2 in a direction substantially perpendicular to the direction of polarization, so that the legs 2b and 2b of the vibrator 2 vibrate so as to move toward and away from each other. In this fundamental vibration, the two legs 2b and 2b vibrate in the same manner with respect to the direction of polarization, and accordingly, the detection electrodes 6a and 6b output the same signal. Therefore, no signal is output from the differential circuit in the detection circuit. In this state, when a rotational angular velocity about a central axis of the vibrating gyroscope 1 is applied, a Coriolis force is applied to the legs 2b and 2b along an axis substantially perpendicular to the direction of fundamental vibration. The Coriolis force is applied to the legs 2b and 2b in opposite directions, and accordingly, the two legs 2b and 2b move in opposite directions. Due to the displacements of the legs 2b and 2b, the detection electrodes 6a and 6b output signals in opposite phases and a large signal is output from the differential circuit.

The output signal from the differential circuit is detected by the synchronous detection circuit in synchronization with a signal from the oscillator circuit, and is converted into a direct-current signal by the integrator circuit. Then, the output signal from the integrator circuit is amplified by the direct-current amplifier circuit. Accordingly, the magnitude of rotational angular velocity can be determined based on the magnitude of the output signal from the direct-current amplifier circuit. In addition, the direction of the rotational angular velocity can be determined based on the polarity of the output signal from the direct-current amplifier circuit.

In this vibrating gyroscope 1, when a rotational angular velocity is applied, the two legs 2b and 2b of the vibrator 2 generate torsional vibration in which the fundamental vibration and vibration substantially perpendicular thereto that is caused by the Coriolis force are combined. The torsional vibration of the vibrator 2 generates two node lines on the support plate 7. More specifically, due to the torsional vibration of the vibrator 2, the support plate 7 generates a bending vibration having a torsional center at a joining portion to which the vibrator 2 is adhered. The two node lines of the bending vibration of the support plate 7 appear at locations outside the vibrator 2. Accordingly, the supporting rods 8 are formed on the two node lines of the bending vibration of the support plate 7, so that the bending vibration of the support plate 7 is not impeded and the vibration of the vibrator 2 is also not impeded when a rotational angular velocity is applied. As a result, an accurate signal corresponding to the rotational angular velocity can be obtained by the vibrating gyroscope 1 (see Japanese Unexamined Patent Application Publication No. 2000-292171).

In such a vibrating gyroscope, the support plate is supported by the supporting rods provided at locations outside the portion at which the vibrator is adhered. Therefore, even though the support plate is supported at the node lines of the bending vibration of the support plate, the support plate cannot freely bend and the torsional vibration of the vibrator cannot be completely prevented from being impeded in the process of detecting the rotational angular velocity. As a result, the vibration frequency of the vibrator is shifted and resonance in a vibration mode different from the expected vibrating mode becomes significant, whereby it is difficult to detect an accurate rotational angular velocity. In addition, since the support plate must extend to regions around the two node lines of the bending vibration, the overall size of the vibrating gyroscope is relatively large.

SUMMARY OF THE INVENTION

To overcome the problems described above, preferred embodiments of the present invention provide a small vibrating gyroscope that isolates or traps torsional vibration of a vibrator so that the vibrator can vibrate in an expected vibration mode when detecting a rotational angular velocity.

According to a preferred embodiment of the present invention, a vibrating gyroscope includes a vibrator having first and second principal surfaces, a support plate that supports the vibrator, and a joining member arranged to join the vibrator to the support plate. The support plate includes a joining portion to which the joining member of the vibrator is joined, an outer frame portion provided on the same plane as the joining portion, and a first support portion arranged to support the joining portion in an air gap portion surrounded by the outer frame portion, the first support portion having a width less than the width of the joining portion.

The joining portion is supported by the first support portion having a small width in the air gap portion surrounded by the outer frame, and the vibrator is joined to the joining portion. Therefore, the first support portion is deformed by the vibration of the vibrator, thereby enable the vibrator to vibrate in a manner similar to free vibration in the air gap portion. Therefore, vibration of the vibrator is isolated or trapped and the vibrator can resonate in the expected vibration mode.

In the vibrating gyroscope, the vibrator may include a vibrating body and an electrode provided on a principal surface of the vibrating body, and may have a tuning-fork shape including a base and at least two rod-shaped legs that extend substantially parallel to each other from the base.

In the vibrating gyroscope including the tuning-fork vibrator, if the vibrator is joined to the support plate having the above-described structure, the torsional vibration is impeded less in the process of detecting the rotational angular velocity. Accordingly, the rotational angular velocity can be more accurately detected.

In addition, a first hollow portion may be provided in the outer frame portion at a location corresponding to the legs of the vibrator, and a second support portion arranged to support the first support portion in the outer frame portion may be formed so as to extend in a direction to intersect the first support portion.

When the vibrator vibrates, not only the first support portion but also the second support portion is deformed so that the vibrator can more easily vibrate. Accordingly, the vibrator can vibrate in a manner similar to free vibration and the vibration isolating effect is increased.

In the vibrating gyroscope including the support plate having the second support portion, second hollow portions having an elongated shape may be provided at both sides of the air gap portion and the first hollow portion so as to extend in a direction in which the legs of the vibrator extend, and third support portions arranged to support the second support portion in the outer frame portion may be provided so as to extend in a direction to intersect the second support portion.

When the vibrator vibrates, not only the first and second support portions, but also the third support portion, are deformed so that the vibrator can more easily vibrate. Accordingly, the vibrator can vibrate in a manner similar to free vibration and the vibration isolating effect is increased.

In the vibrating gyroscope including the support plate having the third support portions, third hollow portions may be provided at both end portions and at central portions of the second hollow portions in the longitudinal direction thereof, the third hollow portions extending from the second hollow portions toward the sides of the outer frame portion.

Since the third hollow portions extend from the second hollow portions toward the sides of the outer frame portion, the outer frame portion is easily deformed in a phase opposite to that of the second and third support portions. Therefore, the amount of displacement of the support plate is reduced and the vibration isolating effect is increased.

In addition, in the vibrating gyroscope including the support plate having the third hollow portions, the third support portions may include projections that extend into the third hollow portions from the second support portion at the central portions of the second hollow portions in the longitudinal direction thereof.

If the projections are provided on the third support portions, the amount of deformation of the third support portions can be reduced while allowing the vibrator to vibrate in a manner similar to free vibration. Accordingly, the amount of displacement in regions around the connecting portions between the outer frame portion and the third support portions is reduced and the isolation of the vibration of the vibrator is increased.

In the above-described vibrating gyroscopes, conductive adhesive may preferably be used as the joining member, for example.

Alternatively, metal bumps may be used as the joining member.

In addition, a metal plate may preferably be used as the support plate, for example.

Alternatively, a multilayer substrate made of resin and metal may be used as the support plate.

Thus, the joining member and the support plate may be made of various materials.

The above-described vibrating gyroscopes may further include a circuit board arranged so as to face a principal surface of the support plate that is opposite to a principal surface to which the resonator is joined, the circuit board having a recess in which wiring electrodes are provided, and an IC chip arranged so as to be connected to the wiring electrodes in the recess. The support plate is arranged so as to face the recess and the opposing principal surfaces of the circuit board and the support plate are adhered to each other with conductive adhesive, for example, so that an electrode on the vibrator is electrically connected to the IC chip.

In the above-described vibrating gyroscope having a large vibration isolating effect, when the circuit board and the IC chip are integrated with each other, the vibrating gyroscope can perform signal processes regarding driving and detection operations of the vibrator. The thickness of the vibrating gyroscope can be reduced by providing the recess in the circuit board, connecting the IC chip to the wiring electrodes provided in the recess, and arranging the support plate to which the vibrator is joined on the recess.

According to preferred embodiments of the present invention, the isolation of the vibration of the vibrator can be increased and a signal accurately corresponding to the rotational angular velocity can be output. Therefore, the rotational angular velocity can be accurately detected using the vibrating gyroscope. In addition, the joining portion to which the vibrator is joined is arranged in the air gap portion surrounded by the outer frame portion. Accordingly, it is not necessary to provide a support plate that extends a large distance outward from the joining portion to which the vibrator is joined. Therefore, the size of the vibrating gyroscope can be reduced. In addition, when the circuit board, the IC, the support plate, and the vibrator are suitably assembled, a thin vibrating gyroscope capable of signal processes can be obtained.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
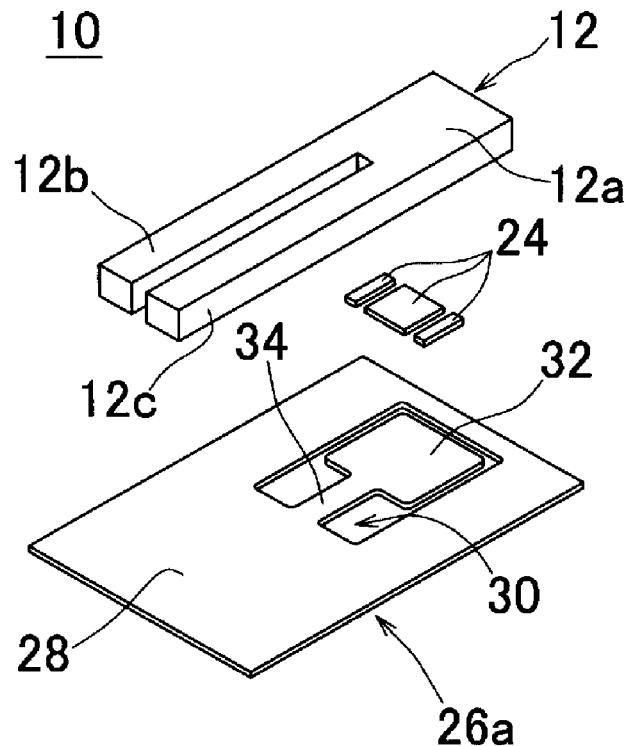
FIG. 1 is an exploded perspective view illustrating a vibrating gyroscope according to a preferred embodiment of the present invention.
Figure 2:
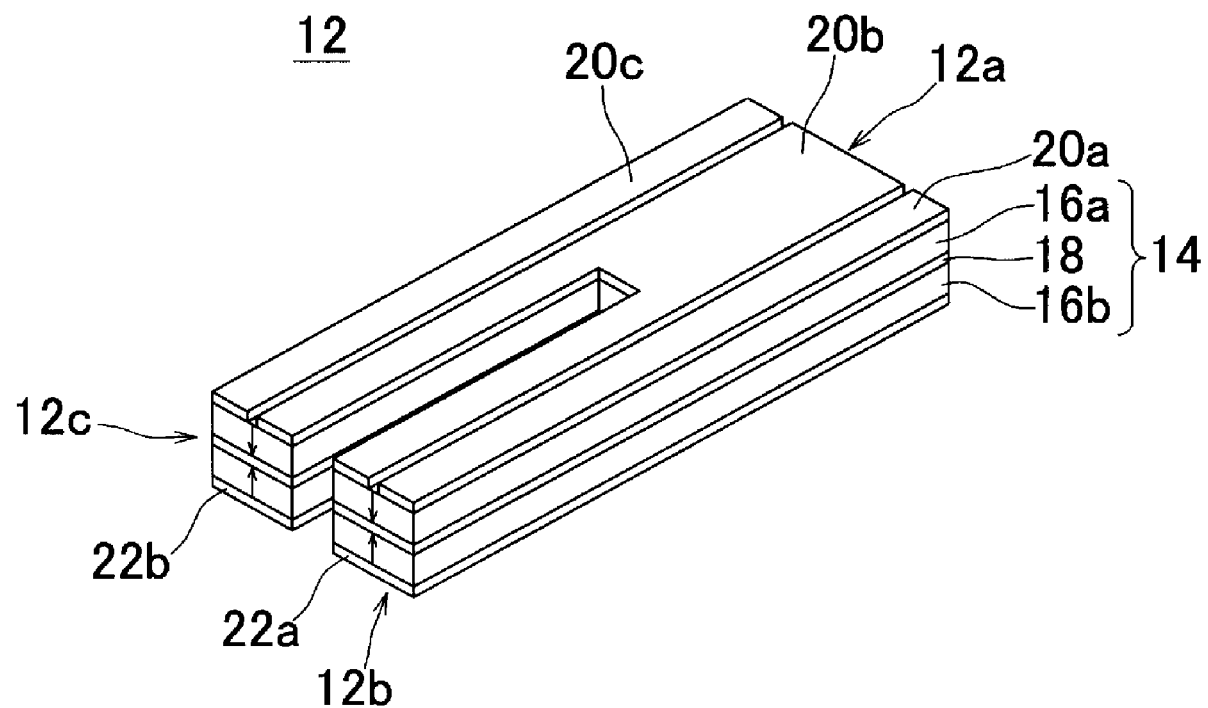
FIG. 2 is a perspective view of a vibrator included in the vibrating gyroscope shown in FIG. 1.
Figure 3:
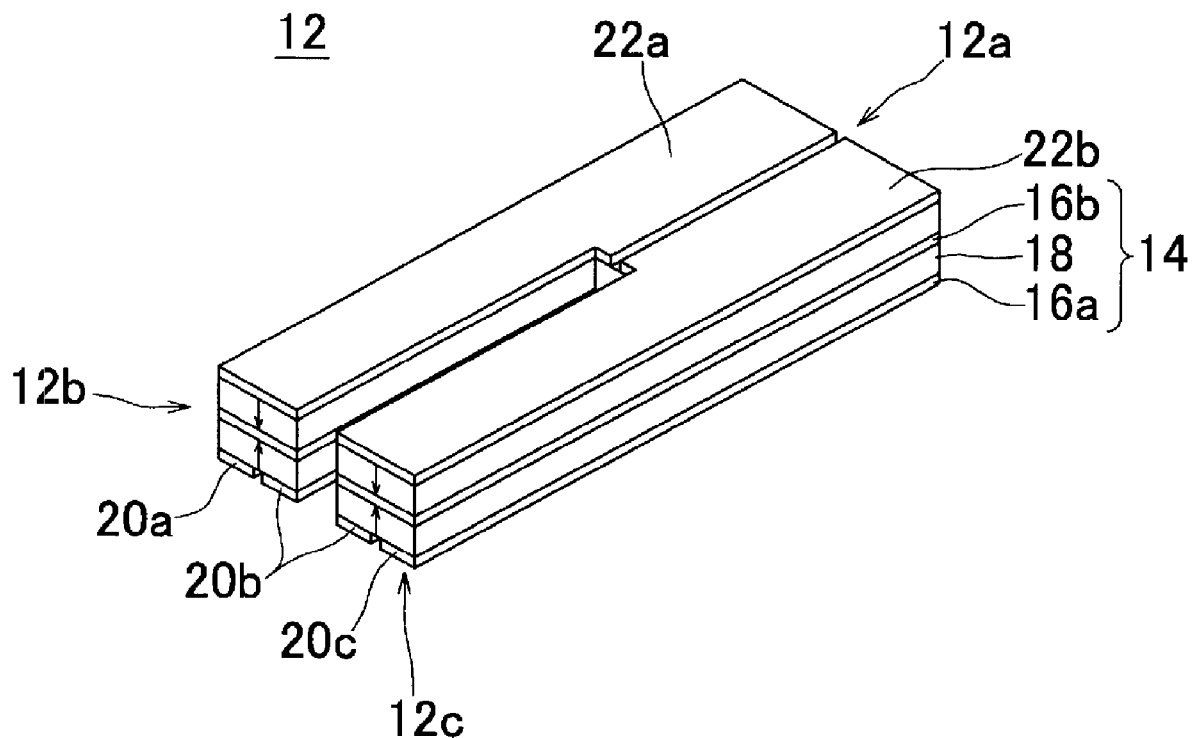
FIG. 3 is a perspective view of the vibrator shown in FIG. 2.

FIG. 1 is an exploded perspective view illustrating a vibrating gyroscope according to a preferred embodiment of the present invention. The vibrating gyroscope 10 includes a vibrator 12. FIG. 2 is a perspective view of the vibrator 12, and FIG. 3 is a perspective view of the vibrator 12. As shown in FIGS. 2 and 3, the vibrator 12 includes a base 12a and two quadrangular prismatic legs 12b and 12c that are configured so as to extend substantially parallel to each other from the base 12a. Thus, the overall body of the vibrator 2 has the shape of a tuning fork.

The vibrator 12 includes a vibrating body 14. The vibrating body 14 includes a first tuning-fork-shaped first piezoelectric substrate 16a and a second tuning-fork-shaped piezoelectric substrate 16b. The piezoelectric substrates 16a and 16b are joined together by an epoxy resin, for example, with an intermediate metal layer 18 interposed therebetween. As shown by the arrows in FIGS. 2 and 3, the piezoelectric substrates 16a and 16b are polarized in opposite directions along the thickness thereof. First and second electrodes are respectively provided on the principal surfaces of the vibrating body 14.

First electrodes 20a, 20b, and 20c are provided on a surface of the first piezoelectric substrate 16a. The three first electrodes 20a, 20b, and 20c are separated from each other along a width direction of the first piezoelectric substrate 16a and are arranged so as to extend from the base 12a to the legs 12b and 12c. The first electrodes 20a, 20b, and 20c are separated from each other at central portions of the legs 12b and 12c in the width direction thereof. As long as the three first electrodes 20a, 20b, and 20c are separated from each other, it is not necessary to provided grooves in the first piezoelectric substrate 16a. However, depending on the manufacturing method, grooves may be provided in the first piezoelectric substrate 16a at locations at which the first electrodes 20a, 20b, and 20c are separated from each other. In such a case, the grooves are formed so as not reach the intermediate metal layer 18.

Second electrodes 22a and 22b are provided on a surface of the second piezoelectric substrate 16b. The two second electrodes 22a and 22b are separated from each other along the width direction of the second piezoelectric substrate 16b and are arranged so as to extend from the base 12a to the legs 12b and 12c. The second electrodes 22a and 22b are separated from each other at a central portion of the base 12a. As long as the second electrodes 22a and 22b are separated from each other, the second piezoelectric substrate 16b may either have or not have a groove. If a groove is formed, it is formed so as not to reach the intermediate metal layer 18.

Figure 4:
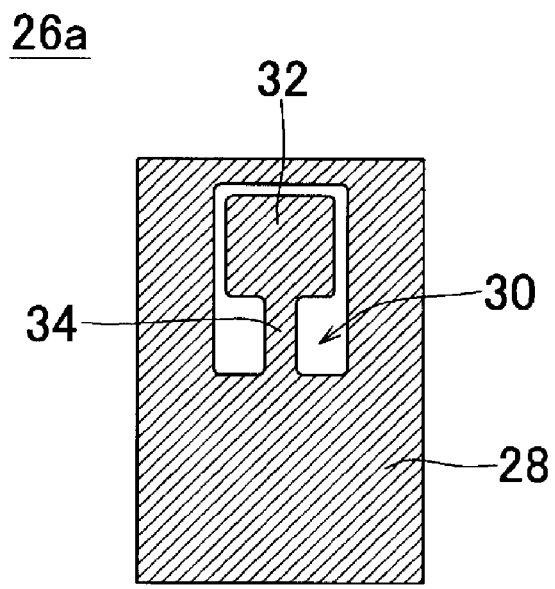
FIG. 4 is a plan view illustrating a support plate included in the vibrating gyroscope shown in FIG. 1.

The vibrator 12 is joined to a support plate 26a by, for example, conductive adhesive members 24 that function as joining members. FIG. 4 is a plan view of the support plate 26a. As shown in FIG. 4, the support plate 26a includes an outer frame portion 28 having a substantially rectangular plate shape. An air gap portion 30 is provided in the outer frame portion 28 at a location near a longitudinal end of the outer frame portion 28, and a joining portion is provided inside the air gap portion 30. The joining portion has a substantially rectangular plate shape and is disposed on the same plane as the outer frame portion 28. The joining portion is supported by the first support portion 34, and is connected to the outer frame portion 28 by the first support portion 34. The width of the first support portion 34 is less than the width of the joining portion 32.

The base 12a of the vibrator 12 is joined to the joining portion 32 of the support plate 26a by the conductive adhesive members 24 or other suitable joining members. In FIG. 1, the first electrodes 20a, 20b, and 20c are preferably joined to the joining portion 32 by three conductive adhesive members 24, for example. Such a joining method is used when, for example, pattern electrodes to be connected to the first electrodes 20a, 20b, and 20c are provided on the support plate 26a. An example of the support plate 26a having such pattern electrodes is a laminate having a three-layer structure including a Cu layer, a polyimide resin layer, and another Cu layer. The laminate may also have a two-layer structure including a Cu layer and a polyimide resin layer or a three-layer structure including a Cu layer, a polyimide resin layer, and a stainless steel layer. When the support plate 26a having such a structure is used, the first electrodes 20a, 20b, and 20c of the vibrator 12 are connected to drive/detection circuits via the pattern electrodes provided on the support plate 26a, so that signals can be input to and output from the vibrator 12.

A metal plate, such as a Cu plate and a stainless steel plate, for example, may also be used as the support plate 26a. In this case, the first electrodes 20a, 20b, and 20c used for driving and detection cannot be joined to the support plate 26a. Therefore, the second electrodes 22a and 22b are joined to the joining portion 32 of the support plate 26a. The first electrodes 20a, 20b, and 20c can be connected to the drive/detection circuits with lead wires or other suitable connection structure. Thus, the surface of the vibrator 12 to be joined to the support plate 26a is selected in accordance with the material of the support plate 26a, the method for providing connection to the drive/detection circuits, and other relevant factors. The vibrator 12 may also be joined to the support plate 26a using, for example, metal bumps.

Figure 5:
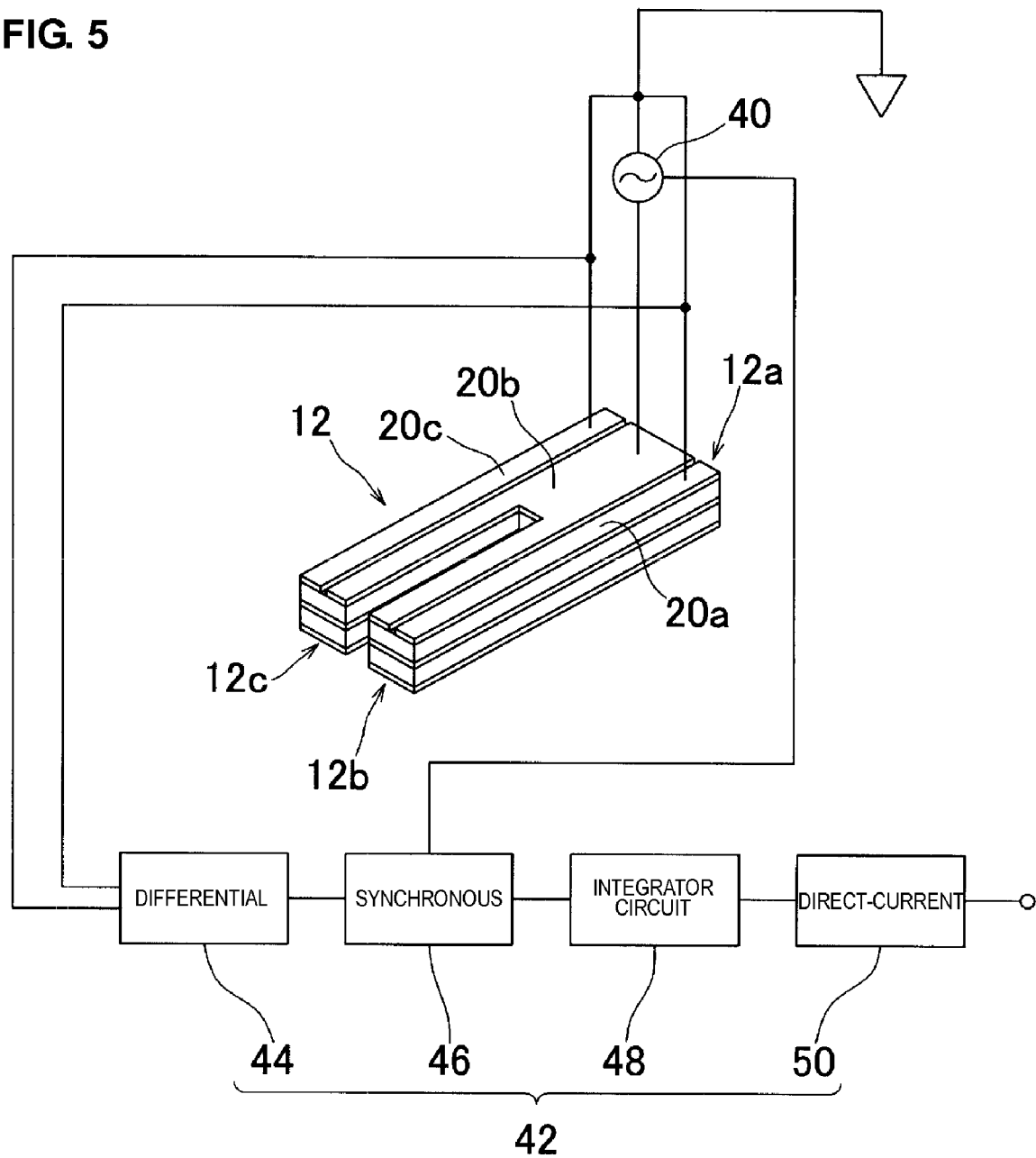
FIG. 5 is a circuit diagram illustrating circuits arranged to detect a rotational angular velocity using the vibrating gyroscope shown in FIG. 1.

FIG. 5 is a circuit diagram illustrating circuits to detect a rotational angular velocity using the vibrating gyroscope 10. The vibrator 12 is preferably excited by, for example, a self-drive method. Accordingly, in the vibrator 12, as shown in FIG. 5, an oscillator circuit 40 is connected between the middle first electrode 20b and the first electrodes 20a and 20c arranged on either side of the middle first electrode 20b. The oscillator circuit 40 includes, for example, an amplifier circuit and a phase compensator circuit. The sum of the output signals from the first electrodes 20a and 20c is amplified by the amplifier circuit, subjected to phase compensation by the phase compensator circuit, and then input to the middle first electrode 20b.

The first electrodes 20a and 20c are connected to a detection circuit 42. The detection circuit 42 includes a differential circuit 44, which outputs a difference between the output signals from the first electrodes 20a and 20c. The differential circuit 44 is connected to a synchronous detection circuit 46, which detects an output signal from the differential circuit 44. The synchronous detection circuit 46 is connected to the oscillator circuit 40 and detects the output signal from the differential circuit 44 in synchronization with the signal from the oscillator circuit 40. In addition, the synchronous detection circuit 46 is connected to an integrator circuit 48, which converts the output signal from the synchronous detection circuit 46 into a direct-current signal. The integrator circuit 48 is connected to a direct-current amplifier circuit 50, which amplifies the output signal from the integrator circuit 48. The detection circuit 42 may also be connected to the second electrodes 22a and 22b instead of the first electrodes 20a and 20c. In such a case, the electrodes on both sides of the vibrator 12 are connected to the drive circuit and the detection circuit. Therefore, it is necessary to connect the electrodes to the drive circuit or the detection circuit with lead wires or other suitable connection structure.

Due to the oscillator circuit 40, fundamental vibration of the vibrator 12 is generated in which the two legs 12b and 12c move toward and away from each other. At this time, the legs 12b and 12c move in the same direction with respect to the direction of polarization, and accordingly, the first electrodes 20a and 20c output the same signal. Therefore, no signal is output from the differential circuit 44. In this state, when a rotational angular velocity about a central axis between the legs 12b and 12c of the vibrator 12 is applied, a Coriolis force is applied to the legs 12b and 12c along an axis substantially perpendicular to the direction of fundamental vibration. Since the legs 12b and 12c move toward and away from each other in the fundamental vibration, the Coriolis force is applied to the legs 12b and 12c in opposite directions. Therefore, the legs 12b and 12c move in opposite directions along an axis substantially perpendicular to the direction of fundamental vibration. As the legs 12b and 12c move, the output signals from the first electrodes 20a and 20c vary in opposite phases. Accordingly, a signal corresponding to the amount of variation in the output signals is output from the differential circuit 44.

A positive or negative portion of the output signal from the differential circuit 44 is detected by the synchronous detection circuit 46 in synchronization with the signal from the oscillator circuit 40. The output signal from the synchronous detection circuit 46 is converted into a direct-current signal by the integrator circuit 48, and is then amplified by the direct-current amplifier circuit 50.

When a large rotational angular velocity is applied, a large Coriolis force is applied and the amount of displacement of the legs 12b and 12c is increased. Accordingly, the level of the output signal from the differential circuit 44 is increased and the level of the output signal from the direct-current amplifier circuit 50 is also increased. Therefore, the magnitude of the rotational angular velocity can be determined based on the level of the output signal from the direct-current amplifier circuit 50. In addition, when the direction of the rotational angular velocity is reversed, the direction in which the Coriolis force is applied is also reversed. Accordingly, the phase of the output signal from the differential circuit 44 is also reversed. Thus, if the direction of the rotational angular velocity is reversed, the polarity of the output signal from the direct-current amplifier circuit 50 is also reversed. Therefore, the direction of the rotational angular velocity can be determined based on the polarity of the output signal from the direct-current amplifier circuit 50.

Figure 6A:
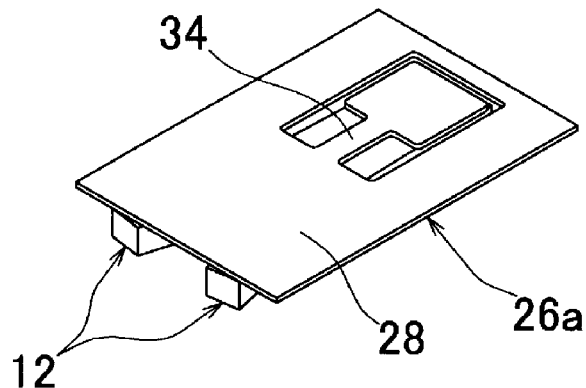
FIG. 6A is a diagram illustrating the fundamental vibration of the vibrating gyroscope shown in FIG. 1.
Figure 6B:
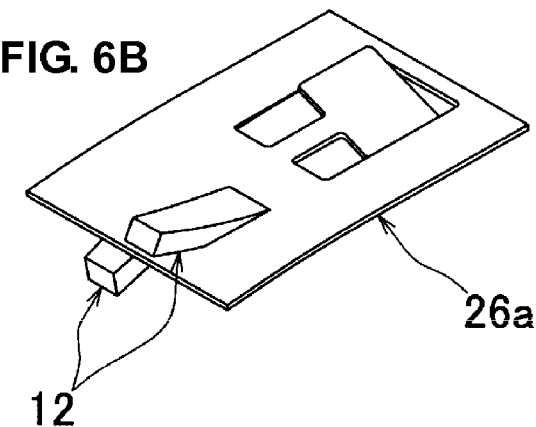
FIG. 6B is a diagram illustrating the vibration of the vibrating gyroscope when the Coriolis force is applied.
Figure 7A:
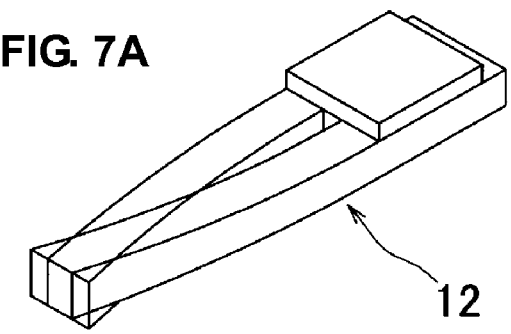
FIG. 7A is a diagram illustrating the fundamental vibration of the vibrating gyroscope in free vibration.
Figure 7B:
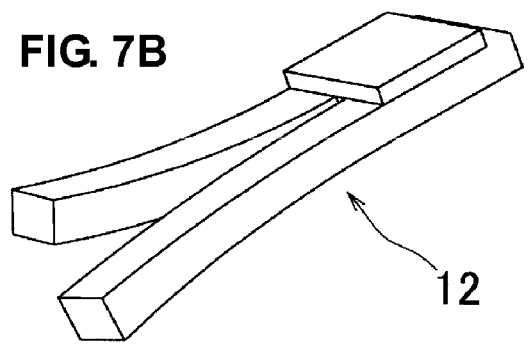
FIG. 7B is a diagram illustrating the vibration of the vibrating gyroscope when the Coriolis force is applied.

FIGS. 6A and 6B illustrate the results of finite element analysis for determining the movement of each portion of the vibrating gyroscope 10 shown in FIG. 1. FIG. 6A is a diagram illustrating the fundamental vibration of the vibrating gyroscope 10, and FIG. 6B is an analysis diagram illustrating the vibration of the vibrating gyroscope 10 when the Coriolis force is applied. For comparison, FIG. 7 shows the results of finite element analysis for determining the movement of each portion in the case where the outer frame portion is removed and the vibrator 12 performs free vibration while floating in the air. FIG. 7A is an a illustrating the fundamental vibration generated when the vibrator 12 performs free vibration. FIG. 7B is an analysis diagram illustrating the vibration of the vibrator 12 when the Coriolis force is applied. In these diagrams, states are shown in which the leg 12c extends through the support plate 26a and the legs 12b and 12c overlap with each other. This is because the movement of each portion is exaggerated to facilitate understanding. The thickness of the conductive adhesive members 24 is sufficiently large enough to cover the vibrating area of the vibrator 12 because the actual movement of each portion is relatively small.

In the vibrating gyroscope 10, although the support plate 26a is fixed at, for example, locations near four corners of the outer frame portion 28, vibration of the vibrator 12 is somewhat impeded by the support plate 26a. However, if the vibrator 12 can vibrate in a manner similar to the free vibration shown in FIG. 7, vibration of the vibrator 12 is not largely impeded and good characteristics can be obtained. As shown in FIGS. 6A and 6B, fundamental vibration generated when no rotational angular velocity is applied is similar to the free vibration. When a rotational angular velocity is applied to the vibrator 12, the first support portion 34 is twisted so as to allow the vibrator 12 to vibrate in a manner similar to the free vibration.

Figure 18:
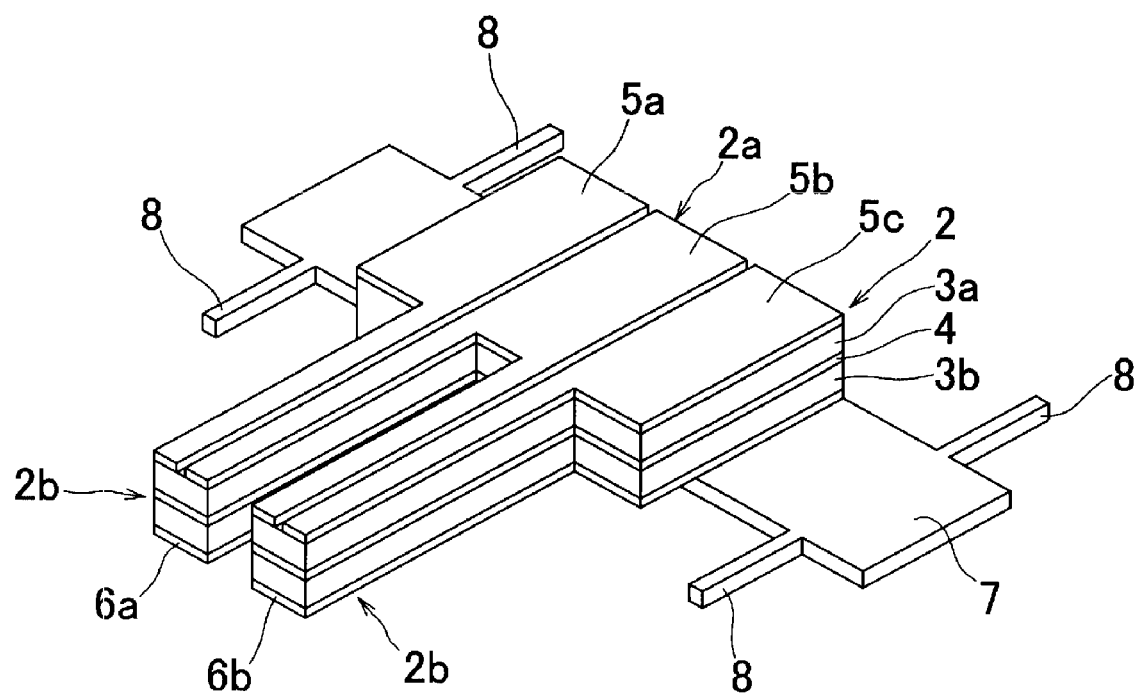
FIG. 18 is a perspective view illustrating an example of a known vibrating gyroscope.

At this time, the outer frame portion 28 is also deformed, and the vibration of the vibrator 12 may be slightly impeded because the outer frame portion 28 is fixed. However, compared to a vibrating gyroscope in which vibration of a vibrator is directly transmitted to a plate-shaped support plate, as shown in FIG. 18, an improved vibration isolating effect is obtained due to twisting of the first support portion 34. Therefore, in the vibrating gyroscope 10, as compared to the known vibrating gyroscope, vibration of the vibrator 12 is impeded to a much less extent and good characteristics are obtained.

Figure 8:
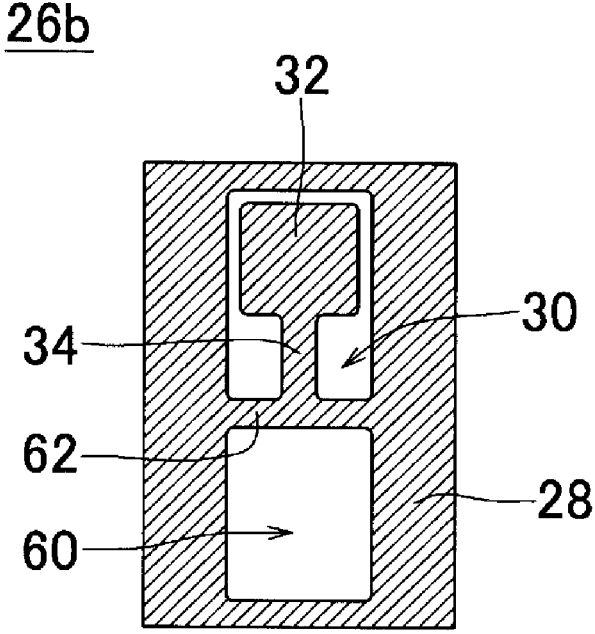
FIG. 8 is a plan view illustrating the support plate included in the vibrating gyroscope according to another preferred embodiment of the present invention.

FIG. 8 is a plan view of another support plate 26b that may be used in the vibrating gyroscope 10. As shown in FIG. 8, in this support plate 26b, an air gap portion 30 is provided in an outer frame portion 28 at a location near one longitudinal end of the outer frame portion 28, and a joining portion 32 is supported by a first support portion 34 in the air gap portion 30. In addition, a first hollow portion 60 having a substantially rectangular shape is provided in the outer frame portion 28 at a location near the other longitudinal end of the outer frame portion 28. Since the first hollow portion 60 is provided, a second support portion 62 is provided so as to extend in a direction substantially perpendicular to the first support portion 34. The ends of the second support portion 62 are connected to the inner periphery of the outer frame portion 28. The first support portion 34 extends from a central portion of the second support portion 62 and supports the joining portion 32 in the air gap portion 30.

Figure 9A:
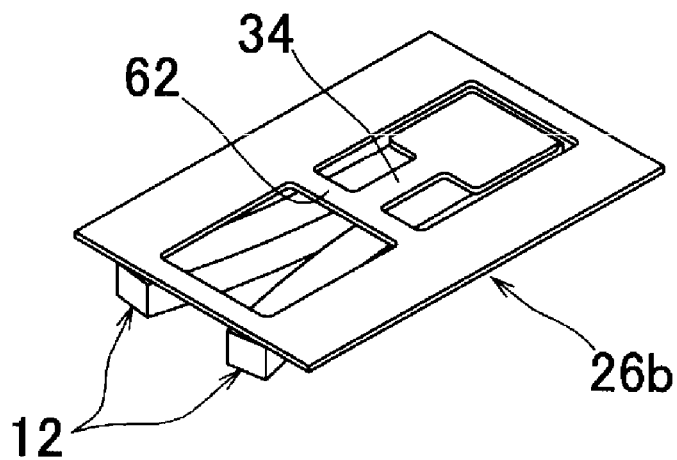
FIG. 9A is a diagram illustrating the fundamental vibration of the vibrating gyroscope including the support plate shown in FIG. 8.
Figure 9B:
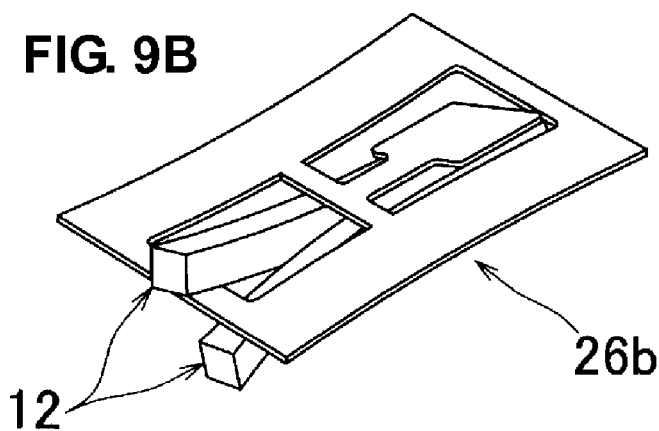
FIG. 9B is a diagram illustrating the vibration of the vibrating gyroscope when the Coriolis force is applied.

FIGS. 9A and 9B illustrate the results of finite element analysis for determining the movement of each portion of the vibrating gyroscope 10 including the above-described support plate 26b. FIG. 9A is a diagram illustrating the fundamental vibration of the vibrating gyroscope 10 including the support plate 26b, and FIG. 9B is a diagram illustrating the vibration of the vibrating gyroscope 10 when the Coriolis force is applied. In the support plate 26b, the second support portion 62 is configured such that the second support portion 62 can be easily deformed. Therefore, the first support portion 34 is twisted and the second support portion 62 is deformed in response to the torsional vibration of the vibrator 12, thereby allowing the vibrator 12 to vibrate in a manner more similar to the free vibration. Therefore, when the support plate 26b is used, the isolation of the vibration of the vibrator 12 can be further increased and good characteristics can be obtained.

Figure 10:
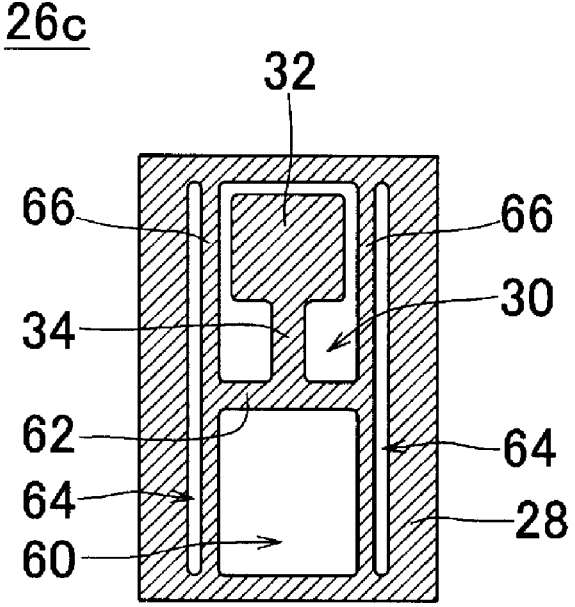
FIG. 10 is a plan view illustrating the support plate included in the vibrating gyroscope according to another preferred embodiment of the present invention.

FIG. 10 is a plan view of another support plate 26c that may be used in the vibrating gyroscope 10. As shown in FIG. 10, in the support plate 26c, second hollow portions 64 having an elongated shape are provided on both sides of an air gap portion 30 and a first hollow portion 60 so as to extend in the direction in which the legs 12b and 12c of the vibrator 12 extend. Since the second hollow portions 64 are provided, third support portions 66 are provided so as to extend from both ends of a second support portion 62 in the longitudinal direction of an outer frame portion 28. The ends of the third support portions 66 are connected to the inner periphery of the outer frame portion 28, and the second support portion 62 is connected to central portions of the third support portions 66. Thus, the second support portion 62 and the third support portions 66 are arranged in substantially an H-shape. A first support portion 34 extends from a central portion of the second support portion 62 and supports a joining portion 32.

Figure 11A:
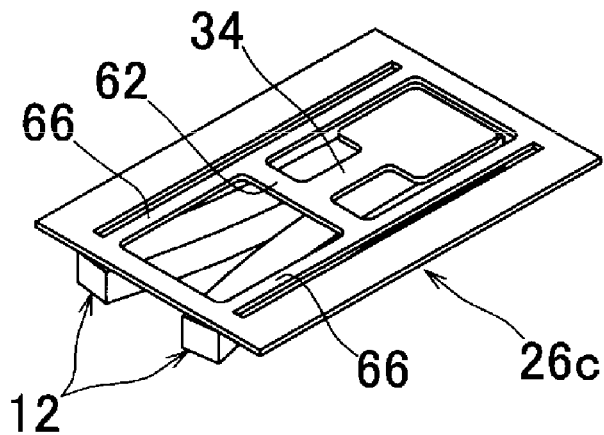
FIG. 11A is a diagram illustrating the fundamental vibration of the vibrating gyroscope including the support plate shown in FIG. 10.
Figure 11B:
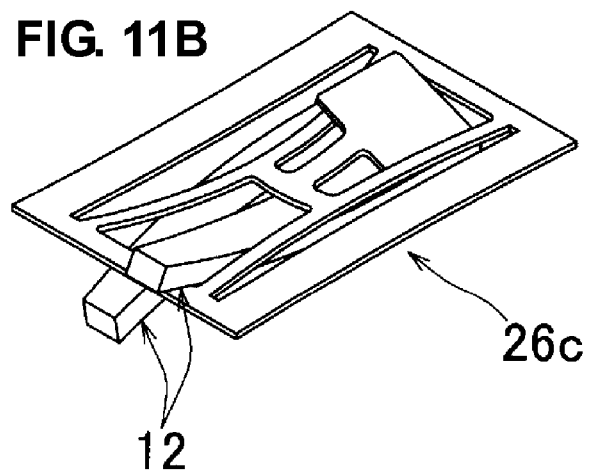
FIG. 11B is a diagram illustrating the vibration of the vibrating gyroscope when the Coriolis force is applied.

FIGS. 11A and 11B illustrate the results of finite element analysis for determining the movement of each portion of the vibrating gyroscope 10 including the above-described support plate 26c. FIG. 11A is a diagram illustrating the fundamental vibration of the vibrating gyroscope 10 including the support plate 26c, and FIG. 11B is a diagram illustrating the vibration of the vibrating gyroscope 10 when the Coriolis force is applied. When the support plate 26c is used, the first support portion 34 is twisted and the H-shaped structure including the second support portion 62 and the third support portions 66 is deformed in response to the torsional vibration of the vibrator 12, thereby allowing the vibrator 12 to vibrate in a manner more similar to free vibration. Therefore, when the support plate 26c is used, the isolation of the vibration of the vibrator 12 can be further increased and good characteristics can be obtained. The longitudinal length of the second hollow portions 64 is not particularly limited as long as the vibration isolating effect can be obtained.

Figure 12:
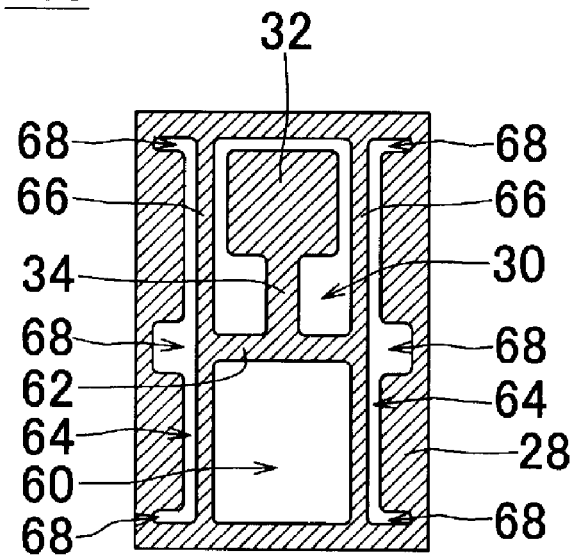
FIG. 12 is a plan view illustrating the support plate included in the vibrating gyroscope according to another preferred embodiment of the present invention.

FIG. 12 is a plan view of another support plate 26d that may be used in the vibrating gyroscope 10. As shown in FIG. 12, the support plate 26d includes a first support portion 34, a second support portion 62, and third support portions 66. In addition, third hollow portions 68 are provided so as to extend from second hollow portions 64 toward the sides of the outer frame portion 28 in the width direction thereof. The third hollow portions 68 are provided at both ends and central portions of the second hollow portions 64. The third hollow portions 68 at both ends of the second hollow portions 64 are arranged at locations corresponding to the ends of an air gap portion 30 and a first hollow portion 60. The third hollow portions 68 at the central portions of the second hollow portions 64 are arranged at locations corresponding to connecting portions between the second support portion 62 and the third support portions 66.

Figure 13A:
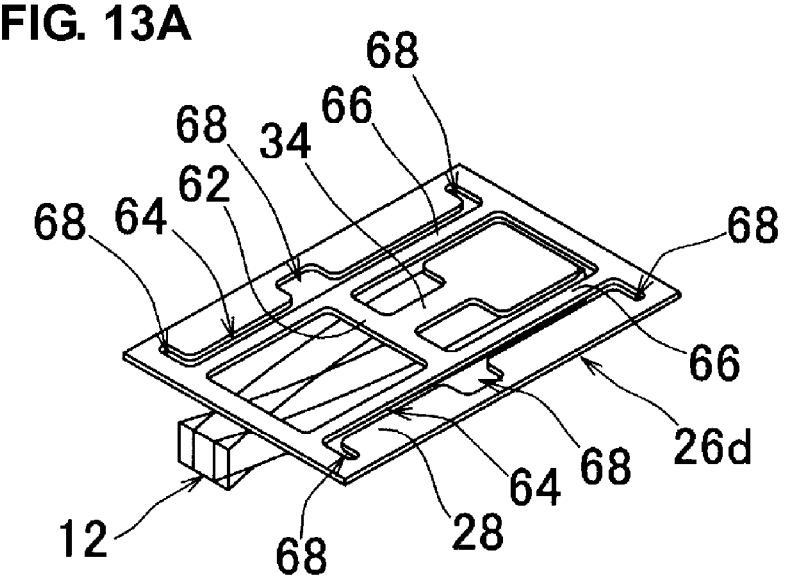
FIG. 13A is a diagram illustrating the fundamental vibration of the vibrating gyroscope including the support plate shown in FIG. 12.
Figure 13B:
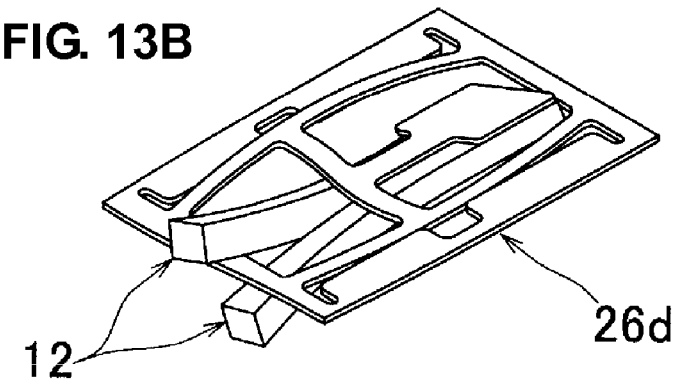
FIG. 13B is a diagram illustrating the vibration of the vibrating gyroscope when the Coriolis force is applied.

FIGS. 13A and 13B illustrate the results of finite element analysis for determining the movement of each portion of the vibrating gyroscope 10 including the above-described support plate 26d. FIG. 13A is a diagram illustrating the fundamental vibration of the vibrating gyroscope 10 including the support plate 26d, and FIG. 13B is a diagram illustrating the vibration of the vibrating gyroscope 10 when the Coriolis force is applied. When the support plate 26d is used, each portion of the support plate 26d is deformed similarly to the case in which the support plate 26d shown in FIG. 10 is included in the vibrating gyroscope 10. However, since the third hollow portions 68 are provided, longitudinal portions of the outer frame portion 28 can easily move in a phase opposite to that of the H-shaped structure including the second support portion 62 and the third support portions 66. Accordingly, the amount of displacement of the overall body of the support plate 26d can be reduced and the isolation of the vibration of the vibrator 12 can be further increased.

Figure 14:
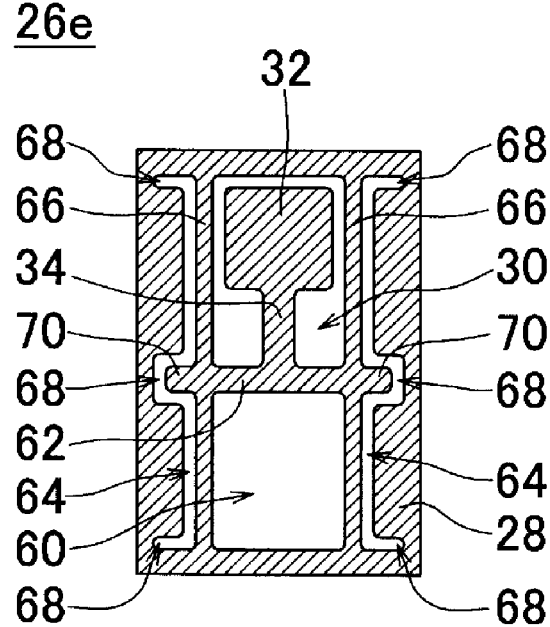
FIG. 14 is a plan view illustrating the support plate included in the vibrating gyroscope according to another preferred embodiment of the present invention.

FIG. 14 is a plan view of another support plate 26e that may be used in the vibrating gyroscope 10. As shown in FIG. 14, this support plate 26e includes third hollow portions 68 extending from second hollow portions 64. In addition, projections 70 are provided so as to project from the third support portions 66 into the third hollow portions 68 at the central portion. The projections 70 are arranged so as to extend from a second support portion 62 at locations corresponding to connecting portions between the second support portion 62 and third support portions 66.

Figure 15A:
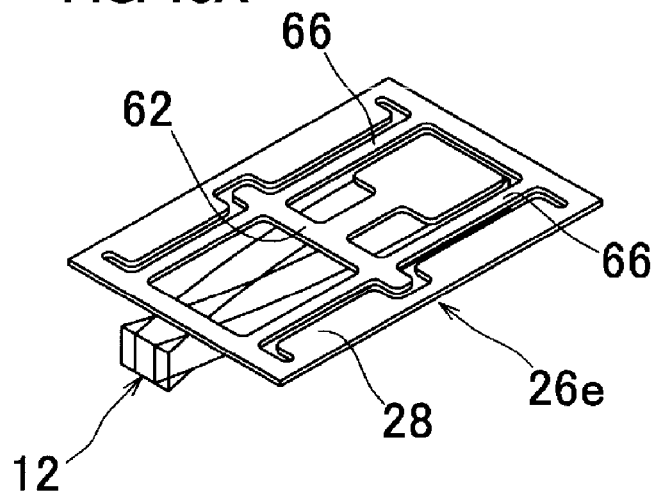
FIG. 15A is a diagram illustrating the fundamental vibration of the vibrating gyroscope including the support plate shown in FIG. 14.
Figure 15B:
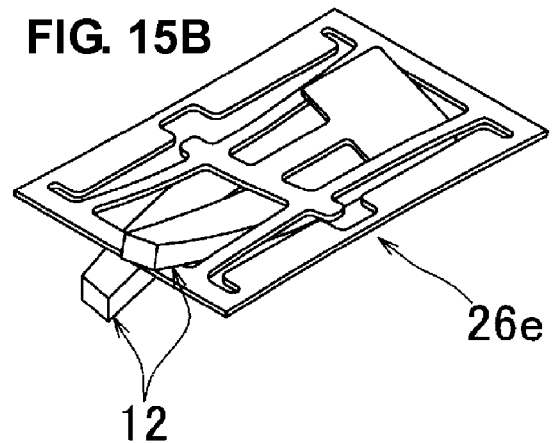
FIG. 15B is an analysis diagram illustrating the vibration of the vibrating gyroscope when the Coriolis force is applied.

FIGS. 15A and 15B illustrate the results of finite element analysis for determining the movement of each portion of the vibrating gyroscope 10 including the above-described vibration plate 26e. FIG. 15A is a diagram illustrating the fundamental vibration of the vibrating gyroscope 10 including the support plate 26e, and FIG. 15B is a diagram illustrating the vibration of the vibrating gyroscope 10 when the Coriolis force is applied. When the support plate 26e is used, the amount of displacement of the H-shaped structure including the second support portion 62 and the third support portions 66 is reduced. Accordingly, the amount of displacement at regions around the connecting portions between the third support portions 66 and the outer frame portion 28 is also reduced. Therefore, the isolation of the vibration of the vibrator 12 can be further increased.

When the support plates 26a to 26e are used, the vibration of the vibrator 12 is impeded to a lesser extent and the vibrating gyroscope 10 with a large vibration isolating effect can be obtained. Accordingly, when the rotational angular velocity is detected, good characteristics can be obtained.

Figure 16:
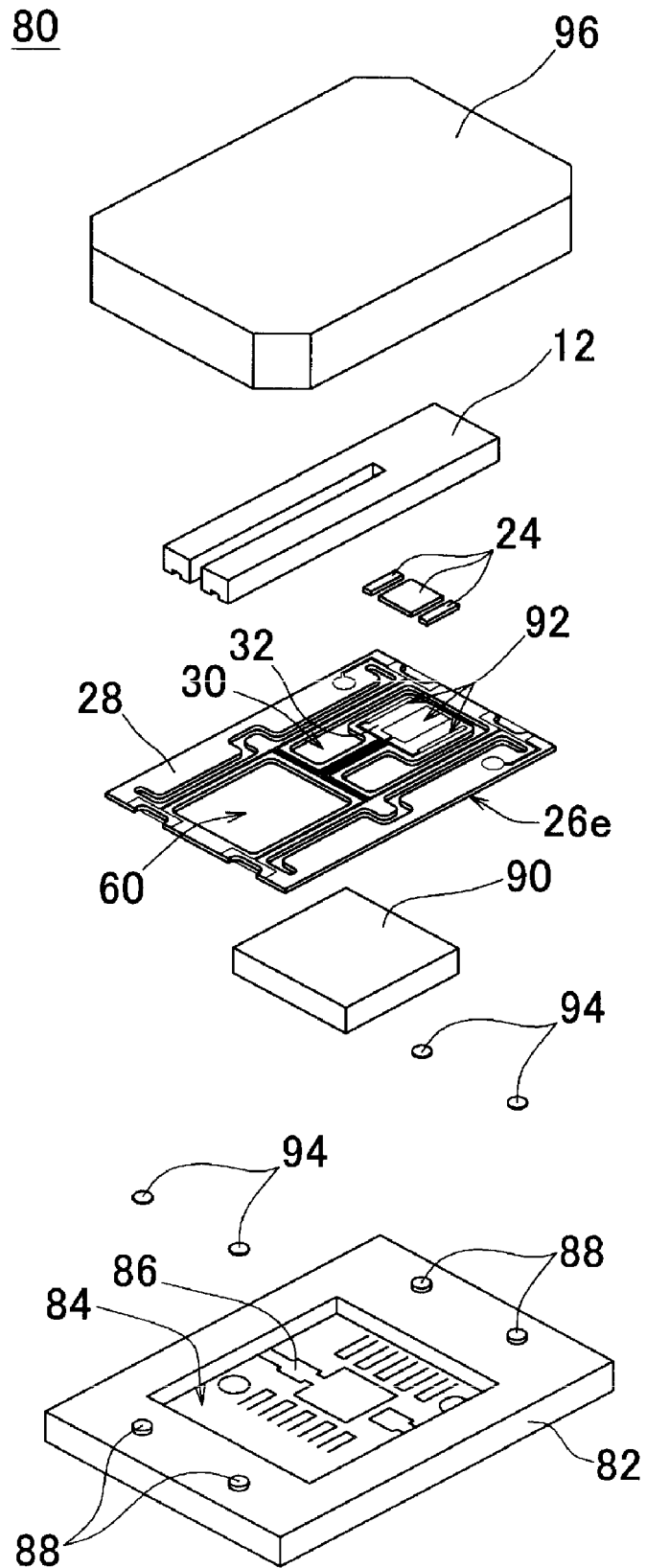
FIG. 16 is an exploded perspective view of a vibrating gyroscope capable of performing signal processes.
Figure 17:
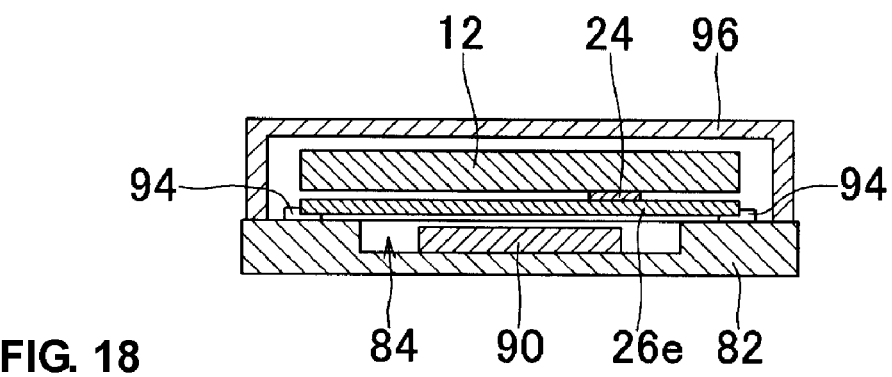
FIG. 17 is a sectional view of the vibrating gyroscope shown in FIG. 16.

As shown in FIGS. 16 and 17, a vibrating gyroscope 80 including circuits to perform signal processes regarding driving and detection operations of the vibrator 12 may be provided. FIG. 16 is an exploded perspective view of the vibrating gyroscope 80 capable of performing the signal processes, and FIG. 17 is a sectional view of the vibrating gyroscope 80. A circuit board 82 is provided in the vibrating gyroscope 80. The circuit board 82 has a substantially rectangular plate shape, for example, and a substantially rectangular recess 84 is provided in one side thereof. Wiring electrodes 86 are provided on the bottom surface of the recess 84. In addition, connection electrodes 88 to provide connection with the wiring electrodes 86 are provided in a region outside the recess 84.

An IC 90 chip is disposed in the recess 84 provided in the circuit board 82. The IC chip 90 includes an oscillator circuit 40, a detection circuit 42, and other suitable circuits, for example. The IC chip 90 is connected to the wiring electrodes 86. In addition, a support plate 26e, for example, is attached to the circuit board 82. Pattern electrodes 92 are arranged on the support plate 26e so as to extend from the joining portion 32 to four corners of the outer frame portion 28. For example, the pattern electrodes 92 are arranged so as to extend from the first electrodes 20a and 20c on both sides of the vibrator 12 to the end of the outer frame portion 28 that is adjacent to the air gap portion 30, and from the first electrode 20b in the middle to the end of the outer frame portion 28 that is adjacent to the first hollow portion 60. In the regions near the four corners of the support plate 26e, the pattern electrodes 92 are arranged so as to extend to the other side of the support plate 26e, at which the pattern electrodes 92 are connected to the connection electrodes 88 on the circuit board 82 with conductive adhesive 94, for example. A laminate having a three-layer structure including a Cu layer, a polyimide resin layer, and another Cu layer is preferably used as the support plate 26e, for example. In addition, in the vibrating gyroscope 80, the above-described support plates 26a to 26d may also be used.

The vibrator 12 is attached to the joining portion 32 by conductive adhesive members 24 on a principal surface of the support plate 26e that is opposite to the principal surface facing the circuit board 82. Thus, the first electrodes 20a, 20b, and 20c of the vibrator 12 are connected to the pattern electrodes 92, and are connected to the IC chip 90. The recess 84 in which the IC chip 90 is disposed is covered by the support plate 26e. Then, a metal cap 96 is attached so as to cover the vibrator 12 and the support plate 26e.

In the vibrating gyroscope 80, the vibrator 12 is excited by the IC chip 90, and signals detected when the rotational angular velocity is applied are processed by the IC chip 90. The IC chip 90 is preferably fixed in the recess 84 of the circuit board 82 and the support plate 26e is attached so as to cover the IC chip 90. In addition, the conductive adhesive members 24 support the vibrator 12 on the support plate 26e and connect the first electrodes 20a, 20b, and 20c to the IC chip 90. Thus, the vibrating gyroscope 80 capable of performing the signal processes and having a reduced thickness is obtained.

In the vibrating gyroscope 80, if the support plate 26e is made of a single panel of Cu or stainless steel, for example, the pattern electrodes cannot be provided on the surface of the support plate 26e. Therefore, the second electrodes 22a and 22b are connected to the support plate 26e. In this case, the first electrodes 20a, 20b, and 20c are connected to the wiring electrodes 86 on the circuit board 82 with lead wires or other suitable connection structure. In addition, the thickness of the vibrating gyroscope 80 can be reduced by providing the recess 84 in the circuit board 82, fixing the IC chip 90 in the recess 84, and attaching the support plate 26e so as to cover the IC chip 90.

In the vibrating gyroscope 80 having a reduced thickness, vibrations of the vibrator 12 can be isolated or trapped by using the above-described support plates 26a to 26e according to preferred embodiments of the present invention. Accordingly, the rotational angular velocity applied to the vibrating gyroscope 80 can be accurately detected.

The vibrator of the vibrating gyroscope according to preferred embodiments of the present invention is not limited to tuning-fork vibrators, and other kinds of vibrators, such as tuning-bar vibrators and unimorph vibrators, for example, may also be used. In addition, the shape of the support portions and hollow portions described in the preferred embodiments of the present invention is not limited to a substantially rectangular shape, and the support portions and hollow portions may also have other shapes, such as an elliptical shape, for example. The second electrodes 22a and 22b provided on the surface of the piezoelectric substrate 16b of the tuning-fork vibrator 12 in the above-described preferred embodiments of the present invention may be partially or entirely omitted.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A vibrating gyroscope comprising:
a vibrator including first and second principal surfaces;
a support plate supporting the vibrator;
a joining member arranged to join the vibrator to the support plate; and
a detection circuit arranged to detect when an angular velocity is applied to the vibrator; wherein
the support plate includes a joining portion to which the vibrator is joined by the joining member, an outer frame portion provided on substantially the same plane as the joining portion, and a first support portion arranged to support the joining portion in an air gap portion surrounded by the outer frame portion, the first support portion having a width less than the width of the joining portion; and
the vibrator includes at least one electrode that is electrically connected to the detection circuit and arranged to output signals to the detection circuit which vary when the angular velocity is applied to the vibrator.

2. The vibrating gyroscope according to claim 1, wherein the vibrator includes a vibrating body and an electrode provided on the first principal surface or the second principal surface of the vibrating body, and has a tuning-fork shape including a base and at least two rod-shaped legs that extend substantially parallel to each other from the base.

3. The vibrating gyroscope according to claim 2, wherein a first hollow portion is provided in the outer frame portion at a location corresponding to the at least two legs of the vibrator, and a second support portion arranged to support the first support portion in the outer frame portion is provided so as to extend in a direction intersecting the first support portion.

4. The vibrating gyroscope according to claim 3, wherein second hollow portions having an elongated shape are provided at both sides of the air gap portion and the first hollow portion so as to extend along a direction in which the at least two legs of the vibrator extend, and third support portions arranged to support the second support portion in the outer frame portion are provided so as to extend in a direction intersecting the second support portion.

5. The vibrating gyroscope according to claim 4, wherein third hollow portions are provided at both ends and central portions of the second hollow portions in a longitudinal direction thereof, the third hollow portions extending from the second hollow portions toward sides of the outer frame portion.

6. The vibrating gyroscope according to claim 5, wherein the third support portions include projections that extend into the third hollow portions from the second support portion at the central portions of the second hollow portions in the longitudinal direction thereof.

7. The vibrating gyroscope according to claim 1, wherein conductive adhesive is used as the joining member.

8. The vibrating gyroscope according to claim 1, wherein metal bumps are used as the joining member.

9. The vibrating gyroscope according to claim 1, wherein a metal plate is used as the support plate.

10. The vibrating gyroscope according to claim 1, wherein a multilayer substrate including resin and metal is used as the support plate.

11. The vibrating gyroscope according to claim 1, further comprising:
- a circuit board arranged so as to face a principal surface of the support plate that is opposite to a principal surface to which the resonator is joined, the circuit board having a recess in which wiring electrodes are disposed; and
- an IC chip arranged so as to be connected to the wiring electrodes in the recess; wherein
- the support plate is arranged so as to face the recess and opposing principal surfaces of the circuit board and the support plate are adhered to each other with conductive adhesive, so that the vibrator is electrically connected to the IC chip.

* * * * *